(12) United States Patent
Frayssignes et al.

(10) Patent No.: US 9,075,681 B2
(45) Date of Patent: Jul. 7, 2015

(54) METHODS AND DEVICES FOR AUTOMATED LOADING OF SOFTWARE, IN AN APPARATUS SUCH AS AN AIRCRAFT, INCLUDING THE UPDATING OF THE ASSOCIATED DOCUMENTATION

(75) Inventors: Anne Frayssignes, Blagnac (FR); Bernard Ordy, Vigoulet-Auzil (FR)

(73) Assignees: AIRBUS OPERATIONS S.A.S., Toulouse (FR); AIRBUS, Blagnac (FR)

( * ) Notice: Subject to any disclaimer, the term of this patent is extended or adjusted under 35 U.S.C. 154(b) by 1114 days.

(21) Appl. No.: 12/722,956

(22) Filed: Mar. 12, 2010

(65) Prior Publication Data

US 2010/0235289 A1 Sep. 16, 2010

(30) Foreign Application Priority Data

Mar. 13, 2009 (FR) ...................................... 09 51619

(51) Int. Cl.
  *G06F 9/44* (2006.01)
  *G06F 9/445* (2006.01)
  *G06Q 30/00* (2012.01)
(52) U.S. Cl.
  CPC ................ *G06F 8/65* (2013.01); *G06Q 30/016* (2013.01)
(58) Field of Classification Search
  CPC ...... G06F 8/60; G06F 8/65–8/68; G06F 8/70; G06F 8/71; G06F 8/73; G06Q 10/20
  See application file for complete search history.

(56) References Cited

U.S. PATENT DOCUMENTS

| | | | | |
|---|---|---|---|---|
| 5,931,877 A | * | 8/1999 | Smith et al. | 701/31.5 |
| 6,003,808 A | * | 12/1999 | Nguyen et al. | 244/1 R |
| 7,127,675 B1 | * | 10/2006 | Kates et al. | 715/705 |
| 7,903,594 B1 | * | 3/2011 | Marmur et al. | 370/310 |
| 8,401,729 B2 | * | 3/2013 | Rouyre | 701/29.3 |
| 2001/0032114 A1 | * | 10/2001 | Sinex | 705/9 |
| 2002/0147974 A1 | * | 10/2002 | Wookey | 717/176 |
| 2002/0188939 A1 | * | 12/2002 | Hediger et al. | 717/174 |
| 2003/0120501 A1 | * | 6/2003 | Peters et al. | 705/1 |
| 2004/0106404 A1 | * | 6/2004 | Gould et al. | 455/431 |
| 2005/0026609 A1 | * | 2/2005 | Brinkley et al. | 455/431 |
| 2005/0187739 A1 | * | 8/2005 | Baust et al. | 702/184 |
| 2006/0122746 A1 | | 6/2006 | Gawlik et al. | |
| 2006/0225041 A1 | * | 10/2006 | Girolami-Rose | 717/124 |

(Continued)

FOREIGN PATENT DOCUMENTS

EP    1 699 031 A1    9/2006

OTHER PUBLICATIONS

Fillon, Pierrick. "An Approach to Impact Analysis in Software Maintenance", Durham University, 1994.*

*Primary Examiner* — Lewis A Bullock, Jr.
*Assistant Examiner* — Keith C Yuen
(74) *Attorney, Agent, or Firm* — Oblon, McClelland, Maier & Neustadt, L.L.P.

(57) ABSTRACT

The invention in particular has as an object methods and devices for automated loading of software, in a piece of equipment such as an aircraft, comprising the updating of the associated documentation. After having received an indication relating to a modification of a software application, a command making it possible to perform the required updating automatically is transmitted to a piece of equipment comprising this software application. In response, an indication relating to the execution of the command is received and a report of execution of the command is transmitted to the manufacturer in order to allow it to update the documentation of the piece of equipment accordingly.

10 Claims, 5 Drawing Sheets

(56) References Cited

U.S. PATENT DOCUMENTS

Figure 1:
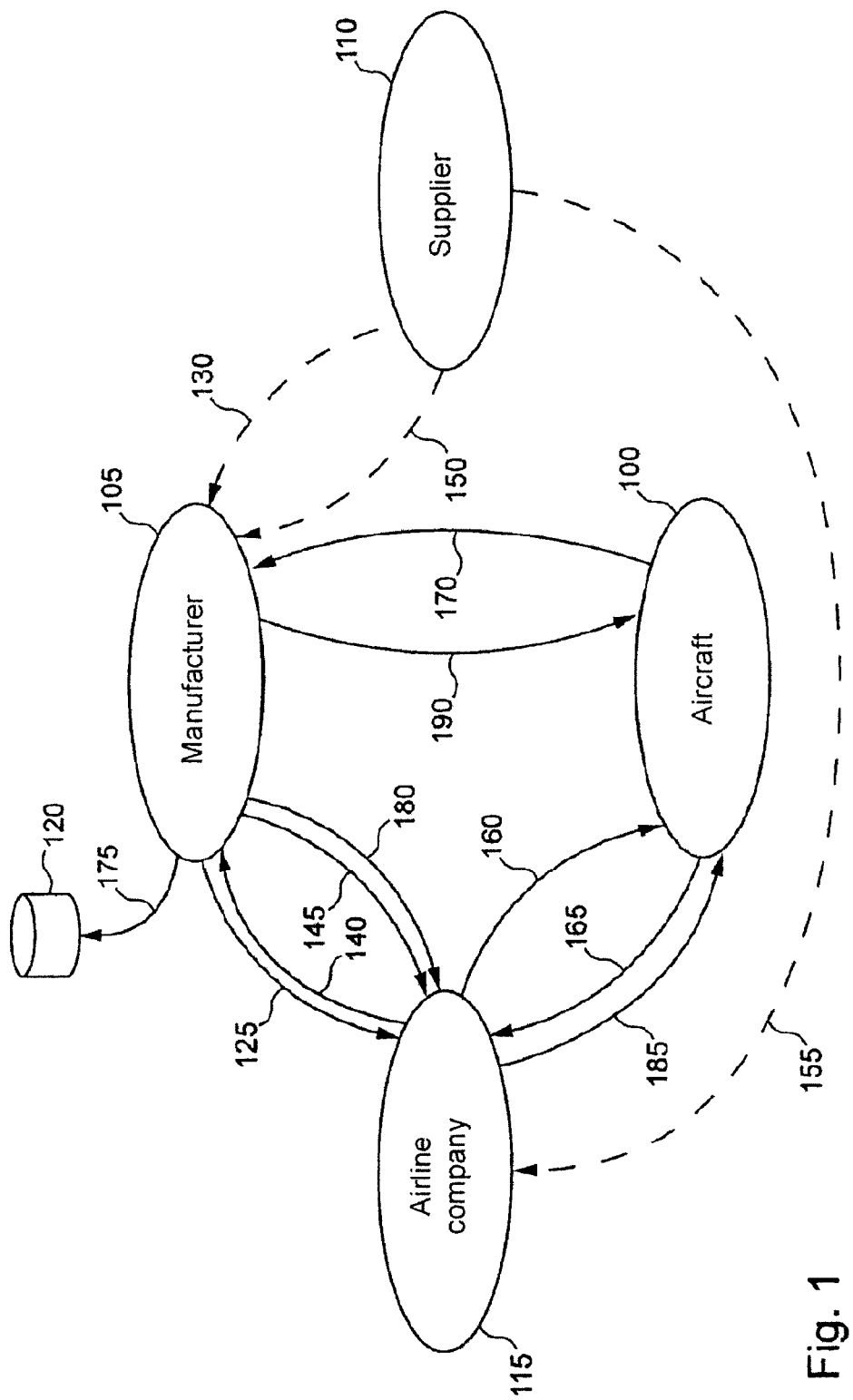

| | | | |
|---|---|---|---|
| 2006/0259499 A1* | 11/2006 | Moulckers et al. | 707/100 |
| 2007/0033108 A1* | 2/2007 | Luhr | 705/22 |
| 2007/0220497 A1* | 9/2007 | Chudukatil et al. | 717/140 |
| 2007/0245339 A1* | 10/2007 | Bauman et al. | 717/174 |
| 2007/0266372 A1* | 11/2007 | Gawor et al. | 717/123 |
| 2008/0235634 A1* | 9/2008 | Stefani | 715/866 |
| 2008/0271012 A1* | 10/2008 | Eykholt | 717/174 |
| 2009/0138516 A1* | 5/2009 | Young et al. | 707/104.1 |

\* cited by examiner

METHODS AND DEVICES FOR AUTOMATED LOADING OF SOFTWARE, IN AN APPARATUS SUCH AS AN AIRCRAFT, INCLUDING THE UPDATING OF THE ASSOCIATED DOCUMENTATION

This invention relates to the management of software applications on board pieces of equipment such as aircraft and more particularly of methods and devices for automated uploading of software, in a specific piece of equipment, comprising the updating of the associated documentation according to the actual modifications introduced.

In general, each aircraft manufactured is delivered to an airline company in a certified configuration. The latter then is described in a document provided to the airline company to enable it to manage the configuration of these aircraft, that is to say, in particular, to identify each of the major components of the aircraft.

The first configuration document provided with the aircraft is called AIR (abbreviation for Aircraft Inspection Report in English terminology). They constitute a kind of photograph of the configuration of the aircraft at the time of delivery thereof. The AIR contains the list of codes called P/N (abbreviation for part number in English terminology) for all the equipment items for which the DAL (abbreviation for Design Assurance Level in English terminology) is greater than D, that is to say for which the consequences in the event of breakdown affecting these equipment items are strictly greater than the threshold called MINOR. The AIR also contains the list of all the P/N for the on-board software components, irrespective of their DAL level.

The P/N identifies the technical solution applied to the mechanical, electronic or software component concerned in order to accomplish the function for which it is intended. A P/N also may be associated with a group of parts forming a functional assembly also called Constituent Assembly in English terminology, such as a landing gear. A P/N is an identifier variable in time according to the manufacturer and the version.

Furthermore, a mechanical, electronic or software aircraft part is identified by an invariant code, called FIN (abbreviation for Functional Item Number in English terminology), designating the function of the part and its location.

Since a technical solution can evolve in time, the aircraft manufacturers generally implement improvement processes according to which some components are replaced by others. For example, a component having a P/N code [A] may be replaced by another having a P/N code [B] offering certain advantages.

The replacement of a component having a P/N code [A] by another having a P/N code [B] is achieved through a configuration management process the evolutional unitary component of which is called modification (MOD). The technical characteristics of the evolution are described in a technical repercussion sheet called Technical Repercussion Sheet in English terminology.

In this way, the configuration of an aircraft leaving a production line may be determined by an AIR and a MOD set resulting from an evolution of the model of the aircraft.

However, if it seems obvious that an aircraft leaving a production line benefits from the very latest improvements introduced by the most recent MOD, the manufacturers generally suggest to the airline companies that they benefit from these same improvements for the aircraft that have been delivered to them. The application of MOD to aircraft already delivered then is carried out by following the indications in a service bulletin, called SB (abbreviation for Service Bulletin in English terminology). These bulletins are official documents used to notify an airline company of the modifications to be made on one or more aircraft that it is operating. They generally are produced by the manufacturers. However, they also may be issued by their suppliers. In this case, the manufacturer must validate them.

An SB, like the MOD, describes the state before application of the SB, for example the use of the component having [A] for a P/N code, and the one after application, for example the use of the component having [B] for a P/N code, the technical improvements introduced by the new components as well as a description of the work to be performed for the replacement of the affected components, for example the duration, the number and qualification of the personnel necessary for application of the SB and the procedures to be applied.

There are several types of SB:
the SB the application of which is mandatory for reasons of safety, called SB Mandatory in English terminology. This type of SB often is free of charge for the airline companies. The manufacturer is systematically informed of the application of this type of SB,
the SB the application of which is strongly recommended by the manufacturer to its client airline companies, and
the optional SB for which the application decision is left entirely up to the airline companies.

The last two types of SB generally are paid for by the airline companies. The manufacturers are not systematically informed of their application (aircraft concerned, date of application) by the airline companies. Thus, by reason of this possible lack of information, it may be difficult, or even impossible, for the manufacturer to provide the documentation corresponding to the new configuration.

However, as the airline companies are answerable before their regulatory authority, since they control the configuration of the aircraft that they operate, after having applied an SB they must update the file describing the configuration of the aircraft.

At the time of their delivery, the aircraft are provided with a documentation intended for the pilots, comprising in particular the flight manual (AFM), the description of the operational procedures (FCOM) and a manual (WBM) for balancing and management of loads, a maintenance documentation, comprising in particular a maintenance manual (AMM) containing various procedures for maintenance of the aircraft, a manual for analysis of breakdown conditions (TSM) and a document (IPC) describing the external physical characteristics of all the removable equipment items of the aircraft as well as all the P/N authorized to be installed thereon, as well as the documentation intended for the cabin crews, consisting in particular of the document describing the operational procedures for use by the cabin personnel (CCOM).

The manufacturers update and manage in a centralized manner an "envelope" documentation covering all the fleets and all the aircraft delivered for the same aircraft family. An adapted documentation then is made available to the airline companies, according to the configuration known by the manufacturer from the stack of MOD/SB applied by the airline companies.

The functioning of the systems described in the various manuals, their method of operation as well as the procedures for use and other similar information items may be led to evolve according to improvements introduced. The documentation made available by the manufacturers therefore must be updated according to the MOD/SB applied on each aircraft.

There thus arises a problem of management of the configuration of the aircraft and of updating of their documentation linked to the following factors,

- customized configuration by the airline companies according to the options selected,
- number of client airline companies of the manufacturers for a given aircraft family,
- different technical solutions authorized for each equipment item of an aircraft, and
- selection in time of the version of each component, according to the application of the MOD/SB, of each aircraft of the fleet of each of the airline companies.

Thus, in addition to the difficulty of management of the documentation, a manufacturer may, when an airline company does not transmit, or is late in transmitting, the application of MOD/SB on one or more of its aircraft, deliver a documentation that is not in conformity with the actual configuration of the aircraft concerned.

The invention makes it possible to resolve at least one of the problems set forth above.

The invention thus has as an object a computer method for automated updating of at least one software application, in a piece of equipment, comprising the updating of a documentation associated with the said piece of equipment, the said updating of the said at least one software application being performed by the operator of the said piece of equipment according to at least one indication relating to a modification of the said at least one software application, received from the said manufacturer, the said documentation being updated by the manufacturer of the said piece of equipment according to the updating of the said at least one software application performed in the said piece of equipment, this method comprising the following steps,

- receiving the said at least one indication relating to the said modification of the said at least one software application;
- transmitting to the said piece of equipment at least one command making it possible to perform automatically the said updating of the said at least one software application;
- receiving from the said piece of equipment at least one indication relating to the execution of the said at least one command; and
- transmitting to the manufacturer a report of execution of the said at least one command, the said report of execution allowing the said manufacturer to update the said documentation of the said piece of equipment in response to the said updating of the said at least one software application actually performed in the said piece of equipment.

The method according to the invention thus enables the operator of the piece of equipment to control the software updates easily and economically. With regard to aircraft, the method according to the invention makes it possible to reduce the downtime of an aircraft. The method according to the invention moreover provides the manufacturer with means for keeping a coherent documentation up to date according to the actual updates introduced in the software applications.

According to a specific embodiment, the method moreover comprises the following steps,

- transmitting a request containing a reference to the said at least indication relating to the said modification of the said at least one software application in order to obtain a description of the said at least one command; and
- receiving the said description of the said at least one command.

In this way the method according to the invention provides a software updating solution easy to implement and not requiring any special development or knowledge for the operator.

The method advantageously further comprises a step of receiving the said updated documentation.

The invention also has as an object a computer method for automated updating of at least one software application, in a piece of equipment, comprising the updating of a documentation associated with the said piece of equipment, the said updating of the said at least one software application being performed by the operator of the said piece of equipment according to at least one indication relating to a modification of the said at least one software application, received from the said manufacturer, the said documentation being updated by the manufacturer of the said piece of equipment according to the updating of the said at least one software application performed in the said piece of equipment, this method comprising the following steps,

- receiving at least one command making it possible to perform automatically the updating of the said at least one software application;
- executing the said at least one command;
- producing a report of execution of the said at least one command; and
- transmitting the said report of execution to the said manufacturer, the said report of execution allowing the said manufacturer to update the said documentation of the said piece of equipment in response to an updating of the said at least one software application actually performed in the said piece of equipment.

In this way the method according to the invention allows the operator of the piece of equipment to control the software updates easily and economically. With regard to aircraft, the method according to the invention makes it possible to reduce the downtime of an aircraft. The method according to the invention moreover provides the manufacturer with means for keeping a coherent documentation up to date according to the actual updates introduced in the software applications.

According to a specific embodiment, the said report of execution is transmitted to the said manufacturer via a system of the said operator. In this way, it is not necessary to use special communications means between the piece of equipment and the manufacturer.

The said at least one command advantageously comprises a command for uploading of at least one software component in order to optimize the software updating.

According to a specific embodiment, the method further comprises a step of validating the said updating of the said at least one software application in order to improve the reliability of the software updating.

Again according to a specific embodiment, the method further comprises a step of updating a copy of the said documentation stored in the said piece of equipment so that the documentation stored in memory will correspond to the actual configuration of the piece of equipment.

The invention also has as an object a computer program comprising instructions adapted for the implementation of each of the steps of the method described above when the said program is run on a computer.

The invention also has as an object an aircraft comprising means adapted for the implementation of each of the steps of the method described above, the said piece of equipment corresponding to the said aircraft.

Figure 2:
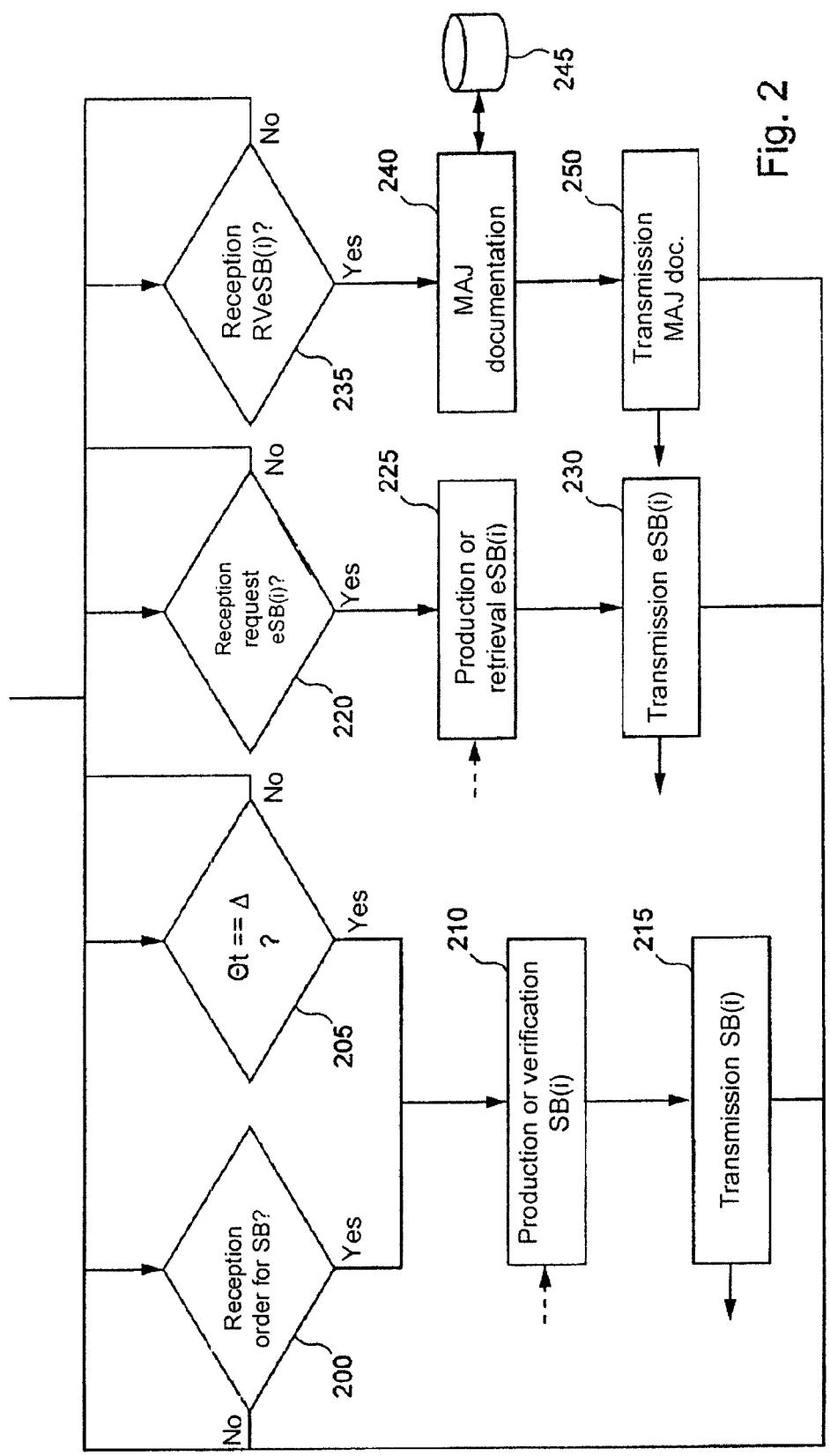
Figure 3:
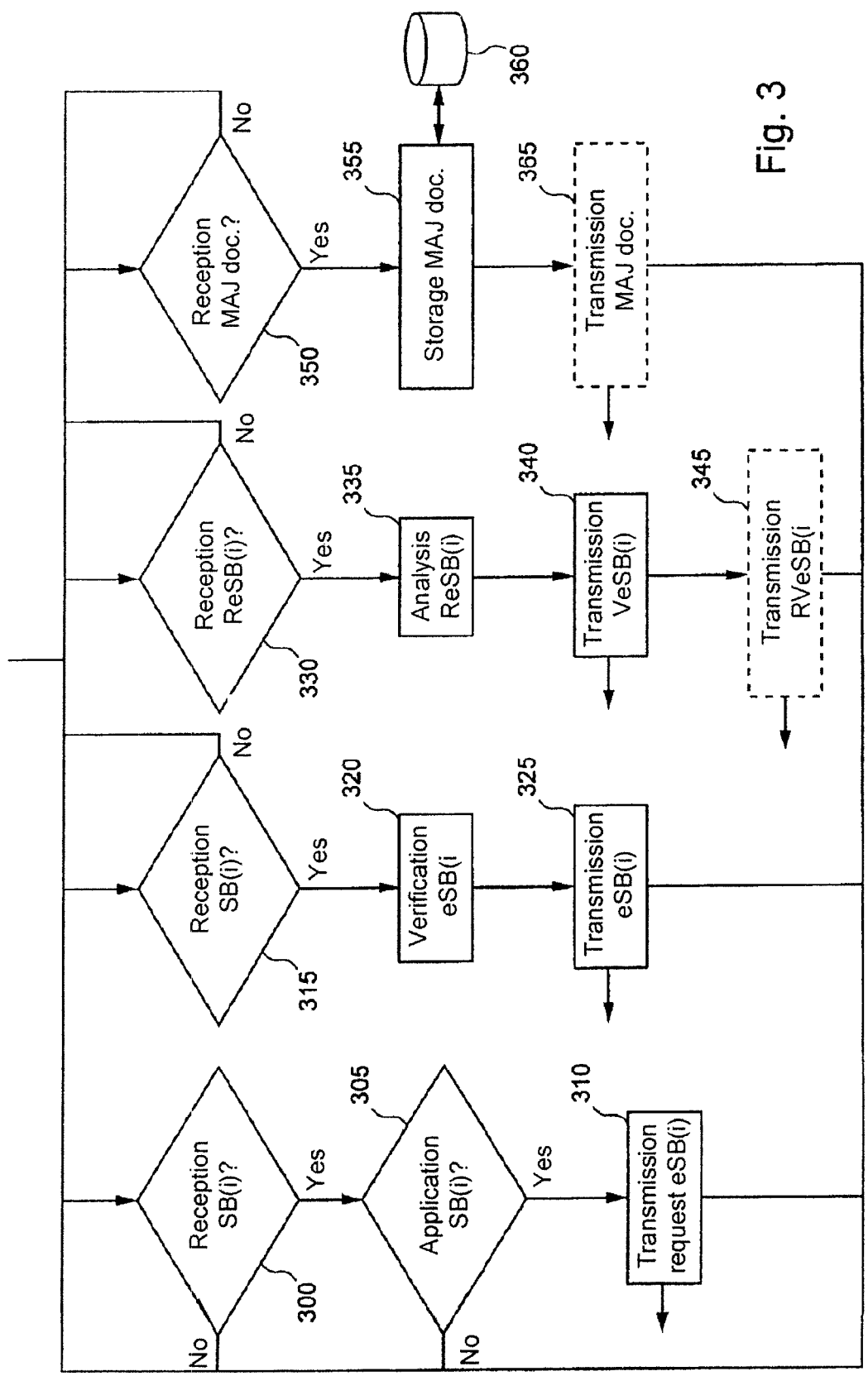
Figure 4:
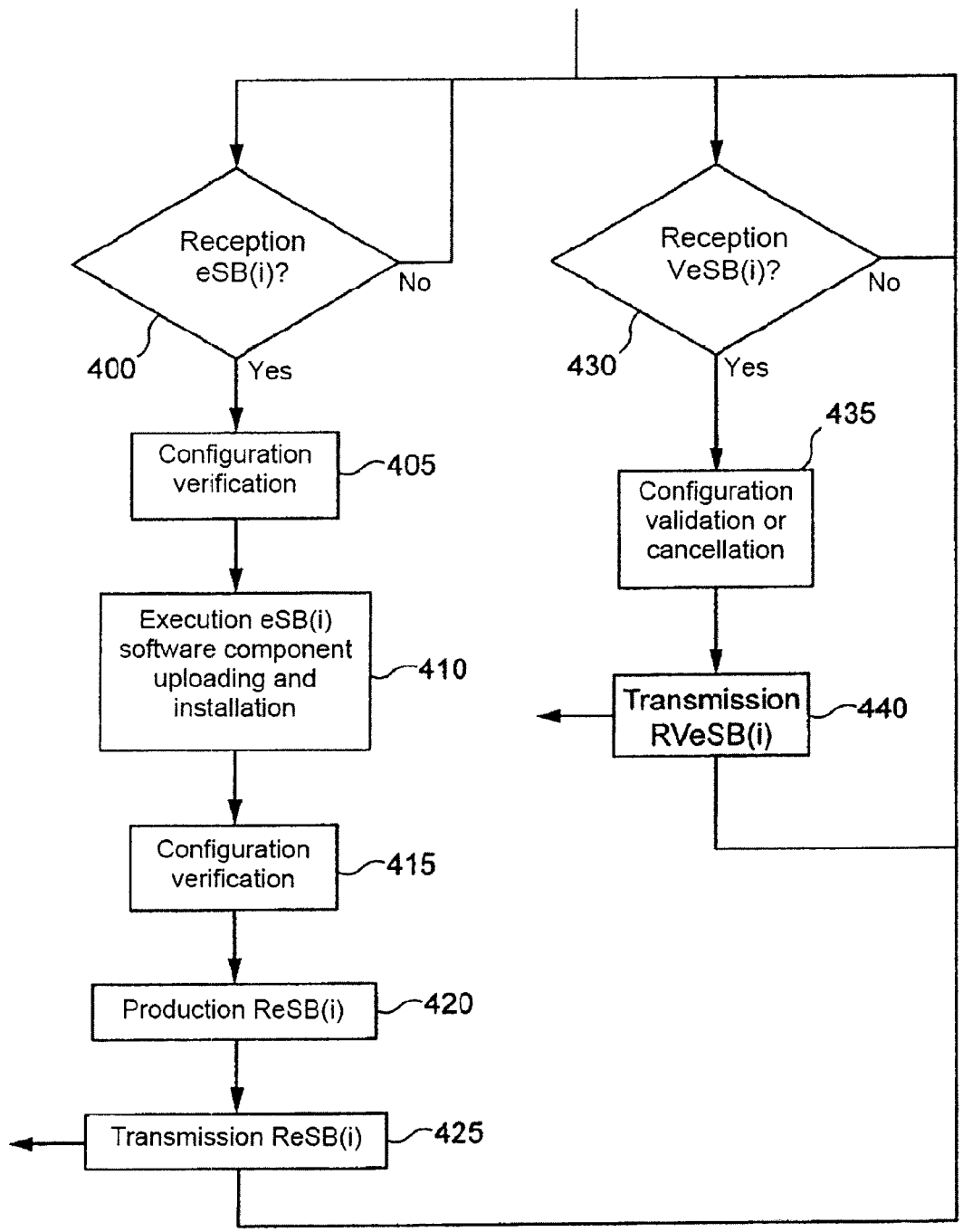
Figure 5:
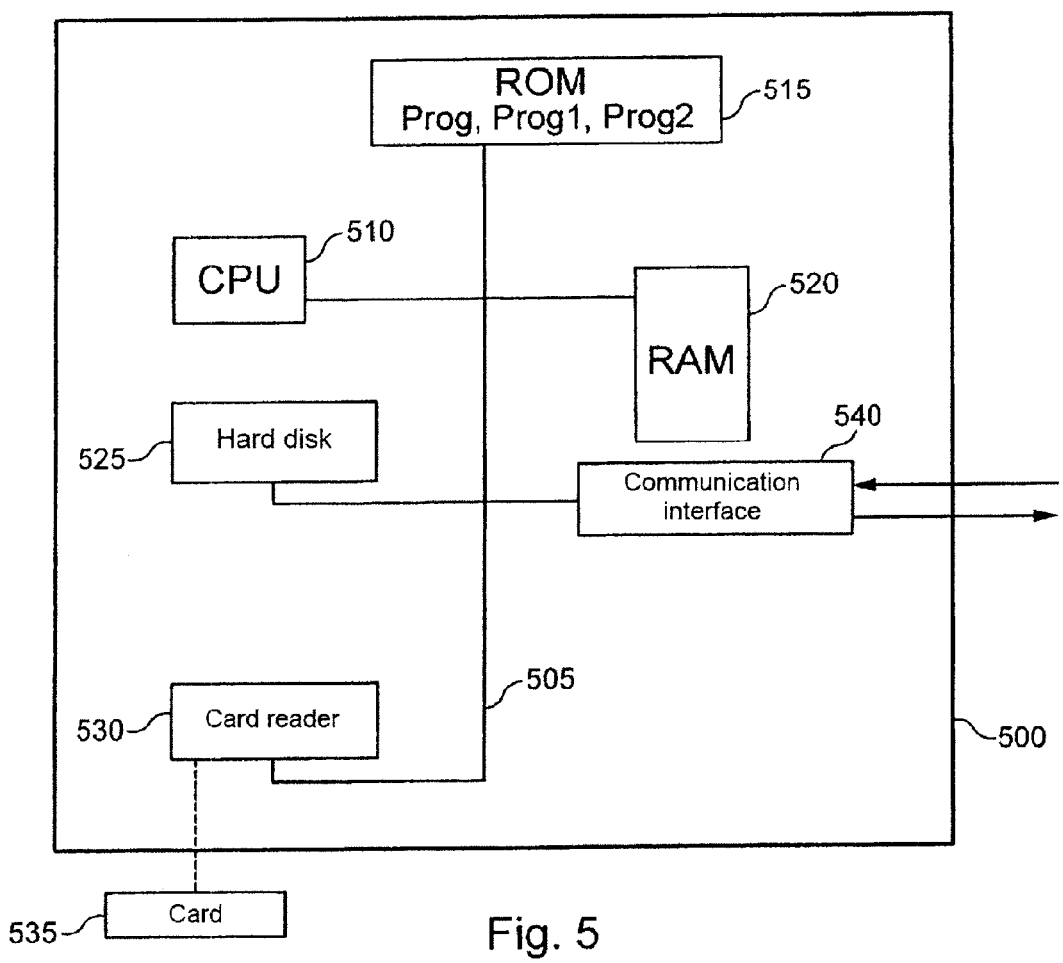

Other advantages, purposes and characteristics of this invention become apparent from the detailed description that follows, presented by way of non-limitative example, with reference to the attached drawings in which:

FIG. 1 schematically illustrates the system for updating the documentation of an aircraft following the transmission of a service bulletin (SB) by a manufacturer, or one of its suppliers, to an airline company;

FIG. 2 schematically illustrates an exemplary algorithm implemented in a computer system of a manufacturer in order to update its documentation relating to a particular aircraft operated by an airline company following the modification of the configuration of this aircraft;

FIG. 3 schematically illustrates an exemplary algorithm implemented in a computer system of an airline company in order to modify automatically, preferably after acceptance, the configuration of an aircraft that it is operating and to allow the manufacturer to update its documentation relating to this aircraft accordingly;

FIG. 4 schematically illustrates an exemplary algorithm implemented in a computer system of an aircraft in order to modify its configuration automatically and to allow the manufacturer to update its documentation relating to this aircraft accordingly; and FIG. 5 schematically illustrates a device adapted for implementing each of the algorithms illustrated on FIGS. 2 to 4.

In accordance with the invention, the devices and methods for automated uploading of the software components in aircraft equipment items comprise mechanisms for updating the electronic documentation associated with each aircraft. By verifying the actual application of the MOD, the electronic documents thus show the exact configurations of the aircraft. In other words and in simplified manner, by uploading a software component in an equipment item of an aircraft, an information item according to which this software component was installed is transmitted to the manufacturer in order to allow it to update the documentation. The latter then is transmitted to the aircraft after updating.

It should be recalled first of all that the aircraft manufacturers as well as their suppliers have observed that evolutions in their equipment items were linked essentially to the rapid and frequent evolution of the software components installed in the memory of these equipment items.

This observation led to the development of equipment items the software components of which may be uploaded, thus allowing the evolution of the equipment items without hardware change. Certain equipment items are updated with the aid of systems, called DLCS (abbreviation for Data Loading and Configuration System in English terminology), which allow an uploading directly from an aircraft. Other equipment items are updated with the aid of portable devices, called PDL (abbreviation for Portable Data Loader in English terminology). Still other equipment items are updated in shops after having been removed. In order to make it possible to determine the configuration of each aircraft, the hardware components of the equipment items as well as their software components are each preferably identified by FIN, P/N and MSN (abbreviation for Manufacturer Serial Number in English terminology, designates the serial number of an aircraft).

Furthermore, the generalization of computer tools makes it possible to use an electronic documentation on the ground or on board the aircraft. The documentation previously delivered in paper form therefore now exists in electronic form. A document navigator, called browser in English terminology, makes it possible to move effectively from one page to another and from one manual to the other. In this way, all the documentation for an aircraft can be contained in CDs (abbreviation for Compact Disc in English terminology) or DVDs (abbreviation for Digital Versatile Disc in English terminology) that are easy to handle.

Thus the invention generally seeks to combine software application uploading functions with the use of an electronic documentation in order to keep the documentation for each aircraft up to date.

FIG. 1 schematically illustrates the system for updating the documentation of an aircraft 100 following the transmission of an SB by a manufacturer 105 or one of its suppliers 110 to an airline company 115.

Reference 100 designates the avionic system of an aircraft, or a part thereof, comprising one or more computers belonging to one or more domains such as the ACD—(abbreviation for Aircraft Control Domain in English terminology) type secured domain and the AISD—(abbreviation for Aircraft Information System Domain in English terminology) type less secured domain. This system makes it possible in particular to communicate with a system outside the aircraft, to receive and install software components, to produce a report of execution as well as a report on the configuration of the aircraft and to communicate these reports to an outside system.

In the same manner, references 105, 110 and 115 designate computer systems comprising, for example, one or more servers or computers, of a manufacturer, of its suppliers and of an airline company, respectively. The system of the manufacturer 105 comprises or is associated with a database 120 in which the electronic documents to be updated according to the application of the MOD are stored.

These computer systems make it possible to receive and transmit data. In general, they also make it possible to execute applications for data processing.

After having identified a modification to be performed on an aircraft 100, the manufacturer 105 creates an SB, in electronic form, and transmits it to the airline company 115 (step 125). As described above, the SB is a document used to officially notify an airline company of a technical change. Here the airline company 115 is notified of the SB preferably at its maintenance center, for example by electronic mail.

When a manufacturer decides on the application of a MOD, it develops an electronic object called eSB, such as a file, which contains commands that can be interpreted on board an aircraft by a DLCS-type device, for example in order to automatically upload a software component in a given computer.

The eSB preferably is secured, for example encoded with the aid of an RSA-type asymmetric encoding algorithm.

Similarly, an SB may be issued by a supplier 110 of the manufacturer 105. Again, the SB is accompanied by the development of an eSB. For reasons of safety, however, the SB preferably is transmitted to the manufacturer 105 (step 130) which verifies it and transmits it to the airline company 115 as described above step (125). The eSB also may be transmitted to the manufacturer.

According to the nature of the SB and the strategy of the airline company, the latter may decide to apply or not to apply the modification linked to the SB received. In the affirmative, it transmits a request to the manufacturer 105 (step 140) in order to receive the object of the SB such as the updating of a software component. This request may be a response, in the form of electronic mail, to notification of the SB.

In response to this request, the manufacturer 105 transmits to the airline company 115 the eSB as well as the corresponding update of a software component (step 145). Alternatively, the manufacturer 105 grants access to these components in one of its servers. The addresses from which these components may be accessed preferably are stored in the aircraft. They also may be specified in the eSB.

If the SB originates from a supplier, the eSB as well as the corresponding update of a software component may be transferred via the manufacturer (steps 150 and 145) or directly (step 155). The supplier also may grant direct access to these components on one of its servers.

After having received the eSB as well as possibly the corresponding updates of a software component, the airline company 115 verifies the components received, in particular their source, and their relevance before transferring them to the aircraft 100 via aboard-ground communication means or via portable means (step 160) and initiating execution of the eSB.

The aboard-ground communication means here are standard communication means such as those defined, for example, by one of the ARINC standards.

After execution of the eSB, the uploading and installation of the software components concerned, the uploading system verifies conformity with the configuration according to the indications received in the eSB and prepares a report of execution. This report of execution is transmitted to the airline company 115 (step 165) as well as to the manufacturer 105 (step 170). This transmission preferably is performed with the aid of aboard-ground communication means.

Such a report of execution here is an electronic report produced by maintenance functions on board the aircraft, called Data Loading and Configuration Reporting function in English terminology, in response to the execution of an eSB, that is to say following the updating of software components in the equipment items. It contains at least one reference to a service bulletin (SB) or to an eSB as well as the references of the equipment items concerned.

Alternatively, in particular in the event of breakdown of the communication means, the transmission may comprise an intermediate step according to which the report is loaded into a portable device connected temporarily to the aircraft, then connected to a system of the airline company, of the manufacturer or to another system from which it is transmitted to the airline company as well as to the manufacturer.

According to another alternative, the report is simply transmitted by the aircraft to the airline company which itself transmits it to the manufacturer.

According to a specific embodiment, the report of execution must be validated by the airline company in order for the modifications performed in the aircraft to be effective. Otherwise, they are cancelled. The report of execution advantageously is transmitted to the manufacturer only after validation.

Upon reception of the report of execution, preferably validated, the manufacturer updates the electronic documentation in database 120 according to the information items contained in this report and the indications of the corresponding SB (step 175). The updated documentation then is transmitted to the airline company (step 180) which itself may transmit it or transmit a part thereof to the aircraft (step 185) so as to be able to be consulted there. The updated documentation also may be transmitted directly to the aircraft by the manufacturer (step 190).

It should be noted here that the general algorithm illustrated on FIG. 1 may be implemented for each MOD/SB or regularly, for example every month.

According to a specific embodiment, the documentation for an aircraft is installed on board. It may be a documentation specific to the aircraft or a complete documentation covering all the options and the configurations proposed by a manufacturer for the aircraft family concerned. In the latter case, the browser application installed on board the aircraft then makes it possible to display only the data relating to the options and the configuration specific to each aircraft. In this way, when an option is installed, it suffices to activate the corresponding module in the documentation.

After having received and executed an eSB, the documentation of the aircraft is locally updated automatically pending official delivery of the documentation from the manufacturer, so that the version of the documentation configured automatically will be in agreement with the actual configuration of the aircraft.

By way of illustration, it may be described in the IPC document describing the external physical characteristics of all the removable equipment items of the aircraft as well as all the P/N authorized to be installed that the equipment items referenced 120 to 130 are equipment items corresponding to the P/N code A and that the equipment items referenced 131 to 140 are equipment items corresponding to the P/N code B. The IPC thus indicates the following parameters, For MSN=120 to 130: EQP=[P/N A]
For MSN=131 to 140: EQP=[P/N B]

When the airline company applies an eSB the object of which is to replace the equipment item referenced 133 corresponding to the P/N code B by an equipment item corresponding to the P/N code A, the IPC is configured automatically. It then displays the following parameters, For MSN=120 to 130, 133: EQP=[P/N A]
For MSN=131-132, 134 to 140: EQP=[P/N B]

Similar procedures may be implemented in order to update the other manuals such as the AMM, the TSM and the FCOM.

Depending on the size of the eSB to be executed and/or the availability or the policy for use of the communications means implemented by the airline company, the eSB may be generated according to different forms.

For example, the eSB may be generated in the form of a component in accordance with secured ARINC standard 665 imported on board the aircraft via a portable medium such as a USB (abbreviation for Universal Serial Bus in English terminology) key or a communication means connected to the AISD world of the aircraft.

The command for execution of the eSB also may be transmitted, for example, in the form of a secured message sent to the DLCS of the ACD domain of the aircraft via AMEX (abbreviation for Aircraft Messaging Exchange in English terminology) or to the DLCS of the AISD domain via the applications called Communication Server and Communication Manager accommodated in this domain.

It should be noted here that the tool for creation of the eSB produced by the manufacturer may be made available to the airline companies to allow them to generate the equivalent of an eSB to execute the automatic uploading of aeronautical databases (independent of the intervention perimeter of the manufacturer) or the uploading of customization files that they may generate themselves.

A non-limitative exemplary eSB code, of XML (abbreviation for Extended Markup Language in English terminology) type, is provided attached hereto.

A first tag, called DLCS_AUTOMATIC_BATCH_JOB, is used here to describe the eSB. The references used may be standardized or determined by the airline companies.

The second tag, called SELECT_DOMAIN, is used to identify the domain of the aircraft in which the software updating is to be performed, that is to say the domain into which the software component received is to be transferred. Here this domain is the domain called "ACD."

The next tag, called UPLOAD_COMMAND_LIST, marks the beginning of the commands to be analyzed and executed by the DLCS in order to upload the software component or components to be uploaded and installed.

The next tag, called STEP, indicates a first sequence number in the steps of uploading and installation of software components. The use of ordered sequences may be particularly relevant in certain cases in order to optimize the use of the pass band of the aboard/ground transmission system, to organize the uploading sequences so as to avoid an installation error or when one or more equipment items require an installation order for different software components.

The next two tags, called COMMAND, correspond to uploading instructions.

The first sequence ends with the tag called END_OF_STEP. A second sequence then is described.

The code corresponding to the eSB then ends with the tags marked END_OF_UPLOAD_COMMAND_LIST and END_OF_JOB_FOR_AUTOMATIC_UPLOADNG.

FIG. 2 schematically illustrates an exemplary algorithm implemented in a computer system of a manufacturer in order to update its documentation relating to a particular aircraft operated by an airline company following the modification of the configuration of this aircraft.

The algorithm shown on FIG. 2 is adapted for cooperating with the algorithms shown on FIGS. 3 and 4.

When the manufacturer's system for management of modifications receives an order to produce an SB (step 200), for example from an engineering department, or at a predetermined time interval (step 205), that is to say when the time interval δt between the present moment and the moment corresponding to the last transmission reaches a predetermined threshold Δ, an SB should be produced and transmitted to an airline company.

The SB, here called SB(i), may be created from the information items received by the manufacturer's system for management of modifications or be received directly from a supplier as illustrated by the ingoing dotted-line arrow (step 210). In the latter case, the manufacturer's system for management of modifications preferably should validate it.

The service bulletin SB(i) then is transmitted to the airline company (step 215), for example in the form of electronic mail, as illustrated by the outgoing arrow.

As described above, the SB(i) contains information items relating to the modifications to be performed, to the aircraft concerned as well as an indication seeking to specify the level of obligation for application of this bulletin, such as mandatory, recommended or optional.

In response to the transmission of the SB(i), the manufacturer's system for management of modifications may receive a request the object of which is the obtaining of the eSB(i) corresponding to SB(i).

If such a request is received (step 220), the manufacturer's system for management of modifications produces the eSB(i) or retrieves it from the supplier at the source of SB(i) as shown by the ingoing dotted-line arrow (step 225). The eSB(i) then is transmitted to the airline company as illustrated by the outgoing arrow (step 230).

It should be noted here that, in a variant, the request seeking to obtain eSB(i) may be transmitted directly to a supplier, according to the agreements between the supplier and the airline company. In this case, steps 220, 225 and 230 are implemented in a system of the supplier.

In response to the transmission of eSB(i), the manufacturer's system for management of modifications receives a validated report of execution of the eSB(i) (step 235), here called RVeSB(i). The validated report of execution RVeSB(i) may be received directly from the aircraft concerned via the communication means of the aircraft or from the airline company via a standard communication network such as the Internet.

The validated report of execution RVeSB(i) is received after the corresponding modification has been performed and validated in the aircraft concerned. The modification performed may correspond to the modification sought by SB(i) or to a portion thereof.

The validated report of execution RVeSB(i) then is analyzed and the documentation linked to the aircraft is modified accordingly (step 240). As shown on FIG. 2, the documentation here is stored in a database 245. As shown by the outgoing arrow, the updated documentation then is transmitted to the airline company (step 250), for example in electronic form via a communication network such as Internet or on an electronic medium such as a CD or a DVD. The electronic documentation also may be transmitted directly to the aircraft involved.

FIG. 3 schematically illustrates an exemplary algorithm implemented in a computer system of an airline company in order to modify automatically, preferably after acceptance, the configuration of an aircraft that it is operating and to allow the manufacturer to update its documentation relating to this aircraft accordingly.

The algorithm shown on FIG. 3 is adapted for cooperating with the algorithms shown on FIGS. 2 and 4.

After having received a service bulletin SB(i) (step 300), the airline company's system for management of modifications analyzes it in order to determine whether or not it is applying it (step 305). The choice of application of the modifications in guided in particular by the nature of the modifications and their mandatory, recommended or optional nature.

If the airline company decides to apply SB(i), it transmits a request to obtain the corresponding eSB(i) as illustrated by the outgoing arrow (step 310). The request to obtain the eSB(i) may be transmitted to the manufacturer or to one of its suppliers. The SB(i) preferably comprises the address, for example an electronic mail address, to which the request to obtain the eSB(i) is to be sent. It may involve, for example, the address of the sender of the SB(i). This request may comprise an acceptance of the manufacturer's and/or of a supplier's conditions, in particular agreement to pay the cost of the modification.

In response to the request for obtaining the eSB(i), the airline company's system for management of modifications receives the eSB(i). Upon its reception (step 315), it is verified (step 320). The verification consists, for example, in authenticating it and decoding it. It then is transmitted to the aircraft concerned as indicated by the outgoing arrow (step 325). According to the nature of the communication means used between the airline company's system for management of modifications and the DLCS of the aircraft, the eSB(i) may be transmitted in coded or non-coded form. The coding may be identical to that used between the manufacturer's and the airline company's systems for management of modifications, similar, or different. It preferably is based on a standard coding algorithm.

In response to the transmission of eSB(i), the airline company's system for management of modifications receives a report of execution of the eSB(i) (step 330), here called ReSB (1). The report of execution ReSB(i) is received directly from the aircraft concerned via the communication means of the aircraft or the airline company.

The report of execution ReSB(i) is received after the corresponding modification has been performed in the aircraft concerned, it has been partially performed or it has not been performed, for example for technical reasons.

The report of execution ReSB(i) then is analyzed (step 335) and a validation message, called VeSB(i), is transmitted to the aircraft as illustrated by the outgoing arrow (step 340). The validation message in particular has as a purpose to confirm or cancel the modification according to the elements of the report of execution. In response to this validation message, the airline company's system for management of modifications receives the validated report of execution RVeSB(i). It preferably contains the same indications as the report of execution with an additional indication of validation. The validated report of execution may be transmitted to the manufacturer's system for management of modifications as shown by the outgoing arrow (step 345) if this is not transmitted thereto directly by the aircraft. Alternatively, the airline company's system for management of modifications receives only a simple acknowledgment of receipt from the aircraft on the basis of which it produces the validated report of execution that is transmitted to the manufacturer's system for management of modifications.

Following modification of the configuration of the aircraft, an updated documentation is received from the manufacturer's system for management of modifications. Upon its reception (step 350), this documentation is stored (step 355), for example in a database 360. If the updated documentation has not been transmitted to the aircraft, it then may be, as shown by the outgoing arrow (step 365).

FIG. 4 schematically illustrates an exemplary algorithm implemented in a computer system of an aircraft in order to automatically modify its configuration and allow the manufacturer to update its documentation relating to this aircraft accordingly.

The algorithm shown on FIG. 4 is adapted for cooperating with the algorithms shown on FIGS. 2 and 3.

When the computer system of the aircraft, for example the DLCS, receives the eSB(i) (step 400), it analyzes the configuration of the aircraft so as to verify it (step 405).

The eSB(i) then is executed in order to allow uploading and installation of the specified software components (step 410). As described above, the address from which these software components may be uploaded preferably is stored in the aircraft (alternatively, the eSB(i) may comprise an indication of this address). The configuration of the aircraft is then verified again (step 415) and a report of execution ReSB(i), preferably comprising the differences in configuration preceding and following execution of the eSB(i) is produced step (420).

The report of execution ReSB(i) then is transmitted to the airline company's system for management of modifications illustrated by the outgoing arrow (step 425). In response to the transmission of this report of execution, a validation message VeSB(i) is received.

Upon reception of the validation message VeSB(i) (step 430), the computer system of the aircraft validates or cancels the new configuration (step 435) according to the content of this message. If the configuration of the aircraft has been modified, a validated report of execution is produced and transmitted to the airline company's system for management of modifications and, preferably, to that of the manufacturer, as illustrated by the outgoing arrow (step 440). Alternatively, it transmits only a simple acknowledgment of receipt to the system for management of modifications of the airline company, which itself produces the validated report of execution which is transmitted to the manufacturer's system for management of modifications.

After modification of the configuration, the aircraft may receive the updated version of the documentation (not shown). Alternatively or additionally, the system of the aircraft itself updates its documentation, as described above, while waiting to receive that sent by the manufacturer.

FIG. 5 schematically illustrates a device adapted for implementing each of the algorithms illustrated on FIGS. 2 to 4. The device shown preferably is a standard device, for example a computer or a server.

Device 500 here comprises an internal communication bus 505 to which there are connected:
- a central processing unit or microprocessor 510 (CPU, abbreviation for Central Processing Unit in English terminology);
- a read only memory 515 (ROM, acronym for Read Only Memory in English terminology) able to comprise the programs necessary for implementation of the invention;
- a random access memory or cache memory 520 (RAM, acronym for Random Access Memory in English terminology) comprising registers adapted for recording variables and parameters created and modified running of the aforementioned programs;
- a communication interface 540 adapted for transmitting and receiving data to and from a communication network, wired or wireless.

Device 500 also preferably has the following components:
- a hard disk 525 able to comprise the aforementioned programs and data processed or to be processed according to the invention; and
- a memory card reader 530 adapted for receiving a memory card 535, or any other external data storage system, and of reading or writing therein data processed or to be processed according to the invention.

The internal communication bus allows communication and interoperability between the various components included in device 500 or connected thereto. The representation of the internal bus is not limitative and, in particular, the microprocessor is capable of communicating instructions to any component of device 500 directly or through another component of device 500.

The executable code of each program allowing the programmable device to implement the processes according to the invention may be stored, for example, on hard disk 525 or in read-only memory 515.

According to a variant, memory card 535 may contain data, in particular a table of correspondence between the events detected and the commands that may be requested, as well as the executable code of the aforementioned programs which, once read by device 500, is stored on hard disk 525.

According to another variant, the executable code of the programs will be able to be received, at least in part, through first communication interface 540, to be stored in a manner identical to that described above.

More generally, the program or programs could be loaded into one of the storage means of device 500 before being executed.

Microprocessor 510 is going to control and direct the execution of the instructions or portions or software code of the program or programs according to the invention, which instructions are stored on hard disk 525 or in read-only memory 515 or else in the other aforementioned storage components. During boot-up, the program or programs that are stored in a non-volatile memory, for example hard disk 525 or read-only memory 515, are transferred into random-access memory 520 which then contains the executable code of the program or programs according to the invention, as well as the registers for storing the variables and parameters necessary for implementation of the invention.

The communication apparatus comprising the device according to the invention also may be a programmed apparatus. This apparatus then contains the code of the computer program or programs for example set in an application-specific integrated circuit, also called ASIC (acronym for Application-Specific Integrated Circuit in English terminology).

Naturally, in order to meet specific needs, an individual competent in the area of the invention will be able to apply modifications in the foregoing description. In particular, the invention may be used to update documentation relating to any piece of equipment operated and maintained by a third party.

Exemplary code for an eSB

```
<DLCS_AUTOMATIC_BATCH_JOB ="MyAirlineUPLJobOfToday" DATE ="12-Dec-07"
    Reference ="MyRef" />
    <SELECT_DOMAIN ="ACD"/>
    <UPLOAD_COMMAND_LIST>
        <STEP ="1" />
            <COMMAND ="UPLOAD" LOAD_PART_NUMBER="ABF55A8FS0L0101" SOURCE
                ="FLS_REPOSITORY_INBOX" TARGET_FIN_SW        ="1TH1SW2"
                TARGET_FIN_SW     ="1TH2SW2"    TARGET_FIN_SW    ="1TH3SW2"
                TARGET_FIN_SW     ="1TH4SW2"    TARGET_FIN_SW    ="1TH5SW2"
                TARGET_FIN_SW     ="1TH6SW2"    TARGET_FIN_SW    ="1TH7SW2"
                TARGET_FIN_SW ="1TH9SW2" />
            <COMMAND ="UPLOAD" LOAD_PART_NUMBER="C0L368316565003 " SOURCE
                ="FLS_REPOSITORY_REFERENCE_AREA" TARGET_FIN_SW ="1TH1SW1"
                TARGET_FIN_SW     ="1TH2SW1"    TARGET_FIN_SW    ="1TH3SW1"
                TARGET_FIN_SW     ="1TH4SW1"    TARGET_FIN_SW    ="1TH5SW1"
                TARGET_FIN_SW     ="1TH6SW1"    TARGET_FIN_SW    ="1TH7SW1"
                TARGET_FIN_SW ="1TH9SW1" />
        <END_OF_STEP ="1" />
        <STEP ="2" />
            <COMMAND ="UPLOAD" LOAD_PART_NUMBER="ABF55A8FS0L0101" SOURCE
                ="FLS_REPOSITORY_INBOX" TARGET_FIN_SW        ="1TH11SW2"
                TARGET_FIN_SW     ="1TH12SW2"   TARGET_FIN_SW    ="1TH13SW2"
                TARGET_FIN_SW     ="1TH14SW2"   TARGET_FIN_SW    ="1TH15SW2"
                TARGET_FIN_SW     ="1TH16SW2"   TARGET_FIN_SW    ="1TH17SW2"
                TARGET_FIN_SW ="1TH19SW2" />
        <END_OF_STEP ="2" />
    <END_OF_UPLOAD_COMMAND_LIST>
<END_OF_JOB_FOR_AUTOMATIC_UPLOADING />
```

The invention claimed is:

1. A computer method for automated updating of at least one software application, in a piece of equipment associated with an aircraft, including updating of a documentation associated with the piece of equipment, the updating of the at least one software application being controlled by a computer system of an airline company, separate from the piece of equipment, according to at least one indication relating to a modification of the at least one software application, received from another computer system of a manufacturer of the piece of equipment separate from the computer system of the airline company and of the piece of equipment, the documentation being updated by the manufacturer according to the updating of the at least one software application performed in the piece of equipment, the method comprising:

receiving, by the computer system of the airline company, the at least one indication relating to the modification of the at least one software application;

transmitting, by the computer system of the airline company, to the piece of equipment at least one command instructing to perform automatically the updating of the at least one software application;

receiving, by the computer system of the airline company, from the piece of equipment a report of execution, wherein the report of execution comprises at least one indication relating to the execution of the at least one command;

transmitting, by the computer system of the airline company, to the piece of equipment a validation message to confirm the execution of the at least one command;

receiving from the piece of equipment, after the transmitting of the validation message, a validated report of execution of the at least one command, wherein the validated report of execution allows the manufacturer to update the documentation of the piece of equipment according to the modification at the piece of equipment;

transmitting, by the computer system of the airline company, in response to the receiving of the validated report of execution from the piece of equipment, the validated report of execution to the another computer system of the manufacturer;

receiving, by the computer system of the airline company after the transmitting of the validated report of execution of the at least one command, the updated documentation related to the validated report of execution and corresponding to the modification at the piece of equipment, from the another computer system of the manufacturer; and transmitting, by the computer system of the airline company, the updated documentation related to the validated report of execution and corresponding to the modification at the piece of equipment, to the aircraft that is associated with the piece of equipment.

2. The method according to claim 1, further comprising:
transmitting a request including a reference to the at least one indication relating to the modification of the at least one software application in order to obtain a description of the at least one command; and
receiving the description of the at least one command.

3. The method according to claim 1, wherein the at least one indication relating to the modification of the at least one software application is included in a Service Bulletin, and
the receiving receives, at the computer system of the airline company, the Service Bulletin from the another computer system of the manufacturer.

4. The method according to claim 1, further comprising:
prior to the transmitting to the piece of equipment of the at least one command instructing to perform automatically the updating of the at least one software application, requesting, by the computer system of the airline company, the at least one command from the computer system of the manufacturer.

5. A non-transitory computer-readable storage medium including computer executable instructions, wherein the instructions, when executed by a computer, cause the computer to perform a method for automated updating of at least one software application, in a piece of equipment associated with an aircraft, including updating of a documentation associated with the piece of equipment, the updating of the at least one software application being controlled by a computer system of an airline company, separate from the piece of equipment, according to at least one indication relating to a modification of the at least one software application, received from another computer system of a manufacturer of the piece of equipment separate from the computer system of the airline company and of the piece of equipment, the documentation being updated by the manufacturer according to the updating of the at least one software application performed in the piece of equipment, the method comprising:
receiving, by the computer system of the airline company, the at least one indication relating to the modification of the at least one software application;
transmitting, by the computer system of the airline company, to the piece of equipment at least one command instructing to perform automatically the updating of the at least one software application;
receiving, by the computer system of the airline company, from the piece of equipment a report of execution, wherein the report of execution comprises at least one indication relating to the execution of the at least one command;
transmitting, by the computer system of the airline company, to the piece of equipment a validation message to confirm the execution of the at least one command;
receiving, from the piece of equipment, after the transmitting of the validation message, a validated report of execution of the at least one command, wherein the validated report of execution allows the manufacturer to update the documentation of the piece of equipment according to the modification at the piece of equipment;
transmitting, by the computer system of the airline company, in response to the receiving of the validated report of execution from the piece of equipment, the validated report of execution to the another computer system of the manufacturer;
receiving, by the computer system of the airline company after the transmitting of the validated report of execution of the at least one command, the updated documentation related to the validated report of execution and corresponding to the modification at the piece of equipment, from the another computer system of the manufacturer; and
transmitting, by the computer system of the airline company, the updated documentation related to the validated report of execution and corresponding to the modification at the piece of equipment, to the aircraft that is associated with the piece of equipment.

6. A computer method for automated updating of at least one software application, in a piece of equipment associated with an aircraft, including updating of a documentation associated with the piece of equipment, the updating of the at least one software application being controlled by a computer system of an airline company, separate from the piece of equipment, according to at least one indication relating to a modification of the at least one software application, received from another computer system of a manufacturer of the piece of equipment separate from the computer system of the airline company and the piece of equipment, the documentation being updated by the manufacturer according to the updating of the at least one software application performed in the piece of equipment, the method comprising:
receiving at least one command instructing to perform automatically the updating of the at least one software application, the at least one command being received from the computer system of the airline company;
executing the at least one command;
producing a report of execution of the at least one command, in response to the updating of the at least one software application actually performed in the piece of equipment;
transmitting, by the aircraft that is associated with the piece of equipment, the report of execution to the computer system of the airline company;
in response to the transmitting of the report of execution, receiving, by the aircraft that is associated with the piece of equipment, a validation message from the computer system of the airline company that confirms the execution of the at least one command;
producing a validated report of execution in response to receiving the validation message from the computer system of the airline company;
transmitting, by the aircraft that is associated with the piece of equipment, the validated report of execution to the another computer system of the manufacturer, the validated report of execution allowing the manufacturer to update the documentation of the piece of equipment according to the modification at the piece of equipment; and
receiving, by the aircraft that is associated with the piece of equipment after the transmitting of the validated report of execution, the updated documentation related to the validated report of execution and corresponding to the modification at the piece of equipment, from the computer system of the airline company.

7. The method according to claim 6, wherein the at least one command includes a command for uploading at least one software component.

8. The method according to claim 6, further comprising validating the updating of the at least one software application, in response to the receiving of the validation message.

9. The method according to claim 6, further comprising updating a copy of the documentation that is stored in the piece of equipment.

10. An aircraft comprising:
a computing device configured to perform automated updating of at least one software application, in a piece of equipment associated with the aircraft, the updating of the at least one software application being controlled by a first computer system of an airline company, separate from the computing device and the piece of equipment, according to at least one indication relating to a modification of the at least one software application, received from a second computer system of a manufacturer of the piece of equipment separate from the first computer system, the computing device, and the piece of equipment, the computing device being configured to:
receive at least one command instructing to perform automatically the updating of the at least one software application, the at least one command being received from the first computer system of the airline company;

execute the at least one command;

produce a report of execution of the at least one command, in response to the updating of the at least one software application being performed;

transmit the report of execution to the first computer system of the airline company;

after transmitting the report of execution, receive a validation message from the first computer system of the airline company that confirms the execution of the at least one command;

produce a validated report of execution in response to receiving the validation message from the first computer system of the airline company;

transmit the validated report of execution to the another computer system of the manufacturer, the validated report of execution allowing the manufacturer to update the documentation of the piece of equipment according to the modification at the piece of equipment; and receive, after the computing device transmits the validated report of execution, the updated documentation related to the validated report of execution and corresponding to the modification at the piece of equipment, from the first computer system of the airline company.

* * * * *